UNITED STATES PATENT OFFICE.

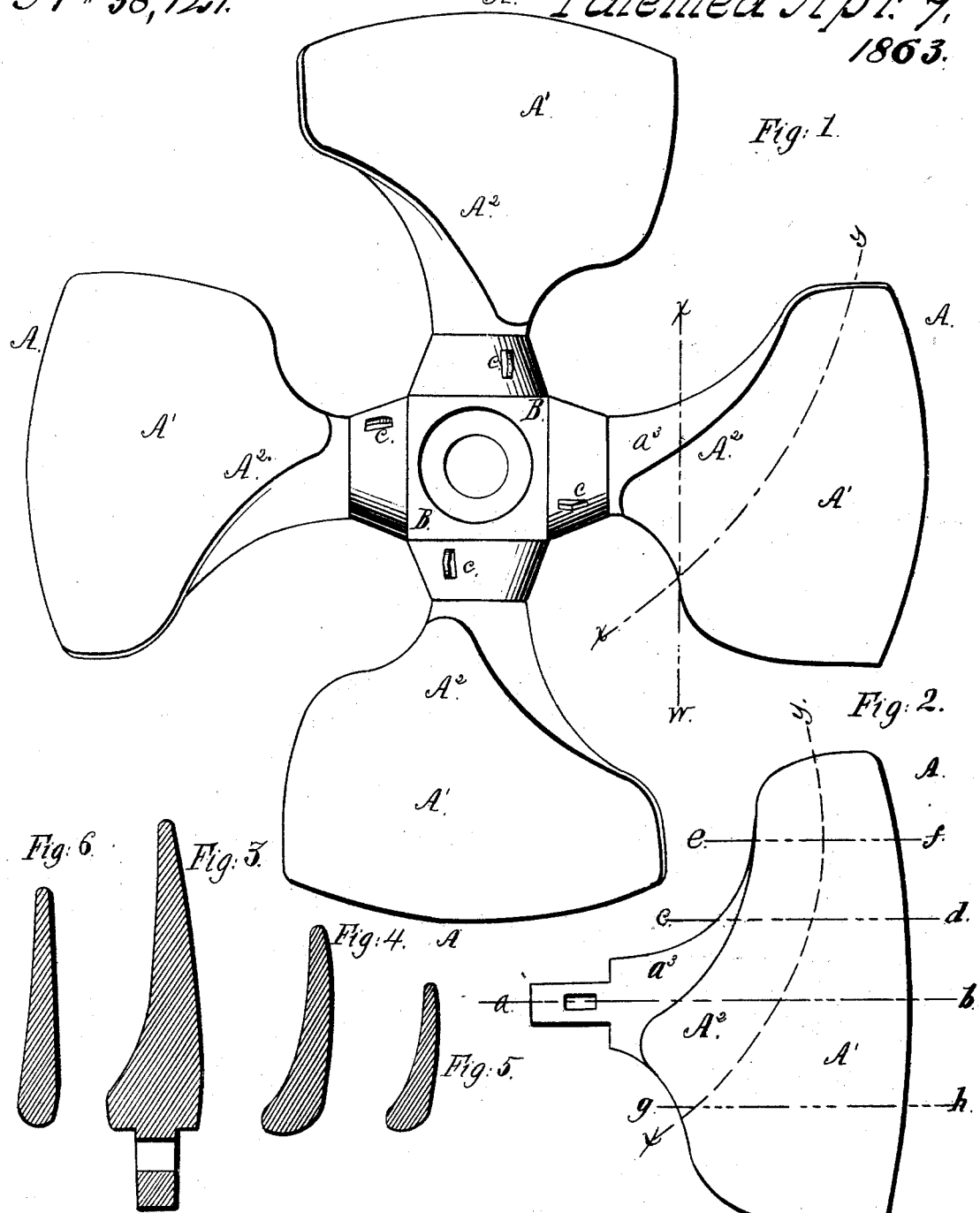

WILLIAM G. OLIVER, OF BUFFALO, NEW YORK.

IMPROVED PROPELLER-BLADES.

Specification forming part of Letters Patent No. 38,121, dated April 7, 1863.

*To all whom it may concern:*

Be it known that I, WILLIAM G. OLIVER, of the city of Buffalo, and State of New York, have invented a new and useful Improvement in Screw-Propellers; and I do hereby declare that the following is a full, clear, and exact description thereof, reference being had to the accompanying drawings, making a part of this specification, in which—

Figure I is a plan of the propeller. Fig. II is a plan of the blade. Fig. III is a section of the blade on line $a\,b$ of Fig. II. Fig. IV is a section on line $c\,d$ of Fig. II. Fig. V is a section on line $e\,f$ of Fig. II. Fig. VI is a section on line $g\,h$ of Fig. II. Fig. VII is a plan of the blade modified to show more distinctly a raised screw-thread upon the face of the blade.

The nature of this invention relates to the formation of a raised screw-curve on the face of the blade, which curve is carried onto and across the shank in a manner to form a screw-thread raised upon the main face of the blade.

Letters of like name and kind refer to like parts in each of the figures.

A represents the blade as a whole. That part of it which lies in front of the line $x\,y$, and marked $A'$, may be of any approved form. The part in rear of this line, and marked $A^2$, embraces the principle of my improvement, and may be described as a raised screw-curve made on the face of the blade, and extending onto and across the shank in a manner to form a screw additional to the main face of the blade, and thereby give an extra purchase upon the water and throw it more directly astern, and give increased power and efficiency to the wheel, by preventing what is termed the "slip." That part of the blade which lies below the line $w\,x$, and marked $A^3$, I denominate the "shank" of the blade.

The screw-curve or screw-thread herein described is raised or built upon the face of the blade, as more distinctly represented in Fig. VII, so that if this part was planed off or cut away it would leave a blade of ordinary construction.

If the form of blade shown in Figs. I and II is filled up a little and beveled off behind the curve, as shown at $A^3$, Fig. VII, leaving the thread at its full height, it will modify the improvement and produce the form substantially as shown at Fig. VII.

The hub is represented at B, and is designed for four blades. Its peculiarity consists in its double barrel-like form, which gives increased strength to the hub where it is most needed, and a conical form to the outside of that part in which is formed the socket for the reception of the end of the shank.

The key which holds the blade to the hub is shown at $c$. The mortises through the hub and shank are so arranged that each key is independent of the other, and either may be put in and removed without disturbing either of the others.

The height of the screw-curve or projection $A^2$, which is raised upon the face of the blade, should be proportioned according to the size of the wheel, and experiments thus far have demonstrated that three-fourths of an inch to one foot in diameter works well, and this may be stated as a general rule. A slight departure from this proportion would not materially change the power of the wheel.

I do not claim, broadly, a curved blade, neither do I claim a curved edge, nor a curved flange upon the edge of the blade; but What I do claim is—

Making a raised screw-curve or projection upon the face of the blade, and extending onto and crossing the shank, and terminating outwardly and upwardly in an angle, as represented in the drawings at $A^2$, for the purposes set forth.

WILLIAM G. OLIVER.

Witnesses:
E. OSBORNE,
E. B. FORBUSH.